F. HULLINGER.
AUTOMATIC HOG GREASER.
APPLICATION FILED MAR. 17, 1913.
1,117,851.
Patented Nov. 17, 1914.
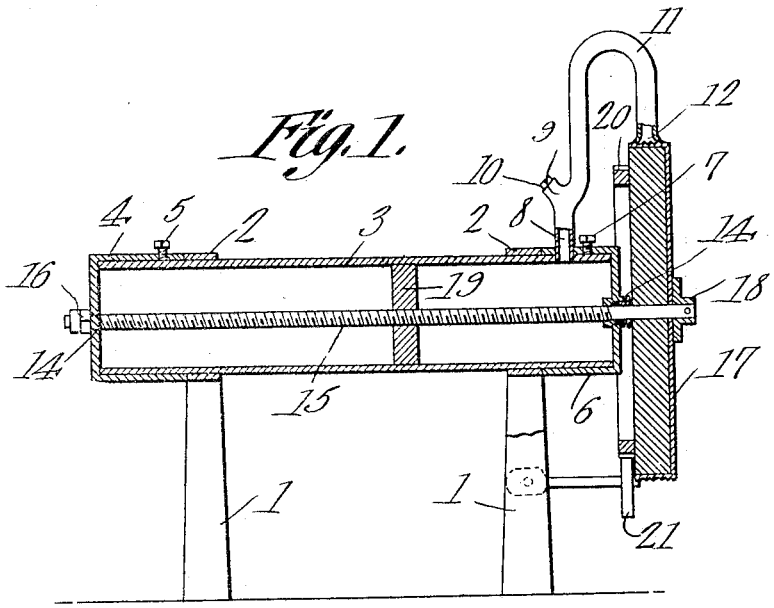
*Fig. 1.*
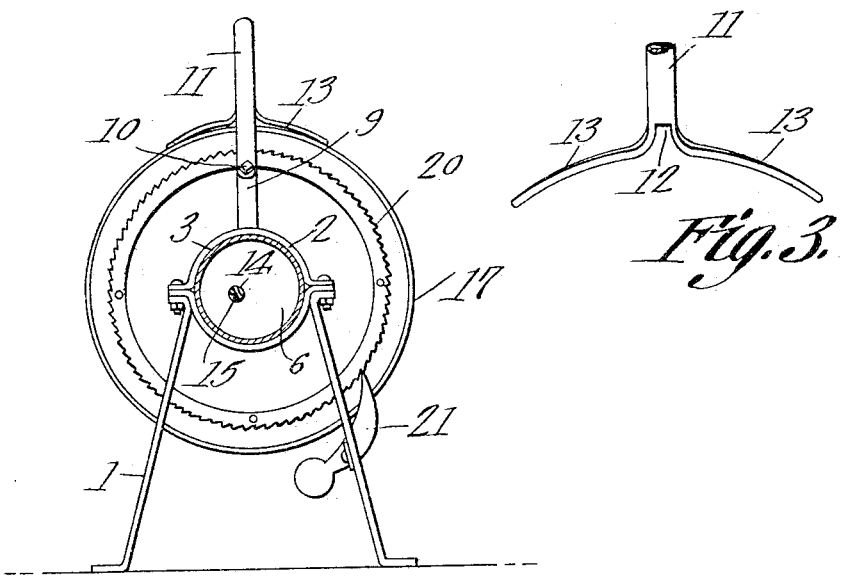
*Fig. 2.*
*Fig. 3.*
Frank Hullinger
Inventor
Witnesses
by
Attorneys

UNITED STATES PATENT OFFICE.

FRANK HULLINGER, OF SAN JOSE, ILLINOIS.

AUTOMATIC HOG-GREASER.

1,117,851. Specification of Letters Patent. Patented Nov. 17, 1914.

Application filed March 17, 1913. Serial No. 754,959.

*To all whom it may concern:*

Be it known that I, FRANK HULLINGER, a citizen of the United States, residing at San Jose, in the county of Logan and State of Illinois, have invented a new and useful Automatic Hog-Greaser, of which the following is a specification.

This invention relates to improved machines for distributing and applying insecticides and disinfectants to the bodies of hogs and other animals.

An object of the present invention is to provide means whereby the animals automatically actuate the device for the applying of the disinfectant and insecticide thereto.

A further object is to provide a machine in which a closed receptacle is provided for the receiving of the grease, disinfectant or insecticide and the same retained therein until such time as an animal automatically operates the machine for the release of the material disposed within the said receptacle.

A further object is to provide improved means whereby a piston head will be drawn downward within a cylinder by a rotating of the piston rod and the so positioning of the piston head with respect to the piston rod that it will be impossible for the piston head to rotate about the piston rod as a center.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a vertical cross sectional view of my improved machine. Fig. 2 is an end cross sectional view illustrating the manner in which the piston head and piston rod are assembled. Fig. 3 is a detail view of the distributing means used in connection with the tank or receptacle for the distribution of the disinfectant or other substance upon the wheel against which the animal comes in contact.

Referring to the drawings in which similar reference numerals designate corresponding parts throughout the several views, 1 designates the supporting legs of the device or machine which legs are secured to the split rings 2 at their upper extremities. As illustrated in Fig. 1 of the drawings there are two sets of the legs 1 and two split rings carried thereby. The said rings are adapted to clamp over and rigidly secure a tank or receptacle 3 preferably cylindrical in form, which tank serves as a receptacle for the insecticide or other substance which it is desired to treat the animals with. A removable cap 4 is secured to the rear end of the cylinder 3 and is rigidly held in place thereupon by means of the set screw 5. A similar cap 6 is rigidly secured to the front end of the cylinder and is rigidly held in place thereon by means of the set screw 7. An aperture is provided through the cap 6 and the wall of the cylinder 3 into which is threadedly secured a delivery pipe 8. The delivery pipe is provided with a Y 9 one leg of which is closed by means of a plug 10, the said plug being removably secured thereto and providing means for the filling of the tank or receptacle 3. The other leg of the Y is extended as at 11 and is bent over and provided with a flared delivery end 12, the same being more fully illustrated in Fig. 3 of the drawings, the said end being provided with the outstanding wings 13 which are arcuated for a purpose more fully hereinafter set forth.

The rear cap 4 and the front cap 6 are provided with apertures 14 therein, the said apertures being formed eccentrically of the cap. A threaded rod 15 extends longitudinally of the cylinder 3 and is journaled within the said apertures 14 of the cap and is held in place thereby, it being noted that a stuffing box is disposed within the aperture 14 of the front cap 6. To the rear end of the rod 15 are secured the retaining nuts 16 and the front portion of the rod projects through the cap 6 for a short distance and has rigidly secured thereto a wheel 17, said wheel being provided with a suitable journal 18 which engages the said shaft 15 and is clamped thereto. The rod 15 is therefore held against longitudinal shifting by means of the retaining nuts 16 upon the rear portion thereof and by means of the wheel 17 secured to the front end thereof. The rod 15 is threaded throughout its length as illustrated in Fig. 1 and threadedly engages a piston head 19 which is actuated thereby. It will be apparent from the foregoing disclosure that inasmuch as the piston rod 15 is mounted eccentrically in the cylinder and threadedly engages the piston head 19 as the rod 15 is rotated, the piston head 19 will be moved forwardly or rearwardly within the tank or receptacle 3 and will act in the capacity of a plunger for the forcing of the material disposed in the forward end of the cylinder out through the delivery pipe 11 and upon the wheel 17 as the latter is rotated. The mounting of the rod 15 eccentrically dispenses with any auxiliary means for preventing the rotation of the cylinder head in unison with the rotation of the rod 15, this being more clearly illustrated in Fig. 2 of the drawings.

The wheel 17 against which the animals contact and rub is illustrated in Fig. 1 of the drawings as comprising an outer metallic shell and a suitable backing disposed therebehind, it being understood however that the precise construction of the wheel is immaterial to the general operation of the device, it only being necessary that the said wheel is provided with a suitable corrugated surface for the receiving and distribution of the germicide or other substance with which the tank is filled. In order to prevent the wheel from moving in the wrong direction which would result in the forcing of the plunger or piston head 15 toward the rear of the cylinder, a suitable ratchet 20 is secured to the inner surface of the wheel and is engaged by a pawl 21 which is pivotally mounted upon one of the legs 1 as illustrated. The pawl 21 is of the weight actuated type and allows for the rotation of the wheel 17 in one direction only the said direction being such that the plunger 19 is moved forwardly which will tend to exert a pressure upon the fluid or substance disposed within the tank and will force the same out through the delivery pipe. When it is desired to fill the tank or receptacle 3 the plug 10 is removed from one leg of the Y 9 and a suitable substance inserted therein, the plunger 19 being moved rearwardly simultaneous to the insertion of the said substance or may be moved rearwardly prior to the insertion thereof, this depending upon the nature of the substance or ingredient with which the tank or receptacle 3 is designed to be filled.

The improved machine is to be placed a suitable distance above the ground so that the hogs or other animals may come in contact with preferably the lower portion of the wheel 17 and will rub thereagainst with the result that the wheel will be rotated and by reason of the pawl and ratchet the said rotation will be limited to one direction only. Upon the rotating of the wheel 17 the plunger or piston head 19 will be moved forwardly and will force the grease, insecticide, or disinfectant out through the delivery pipe 11 and upon the upper periphery of the wheel, the flaring wings 13 of the delivering pipe preventing the applying of too large a quantity to a single portion of the said wheel and tends to distribute the same over the entire surface of the said wheel. The animals will therefore come into contact with the said substance and will have the same applied thereto. The substance disposed within the tank will be protected from the weather and elements and will thus remain in a proper condition for an indefinite period. Furthermore there will be no clogging due to any foreign material, it being impossible for the same to get within the tank.

Having thus fully described the invention, what I claim to be new and original with me is:—

1. A hog greaser comprising a receptacle, a plunger slidably carried thereby, a shaft engaging said plunger, adapted to move said plunger with respect to the receptacle for the ejection of material therefrom, an animal operated rotatable element carried by the said shaft, and means leading from the said receptacle adapted to distribute material as it is ejected from the receptacle to and upon the said animal operated rotatable element.

2. A hog greaser comprising a receptacle, a plunger slidably disposed therein, a shaft engaging said plunger, an animal operated rotatable element carried by the said shaft, the rotation of said rotatable element adapted to eject material from said receptacle, and means whereby the said ejected material is led to and distributed upon said animal operated rotatable element.

3. The combination of a cylindrical tank, a plunger disposed therein and adapted to move longitudinally thereof, a threaded rod disposed within said tank and mounted eccentrically thereof and threadedly engaging said plunger, animal operated rotatable means adapted to rotate said rod for the actuation of said plunger, means communicating with said tank adapted to distribute the contents of said tank as the same are ejected therefrom upon said rotatable means, and means for limiting the rotation of said rotatable means to one direction.

4. A hog greaser comprising a tank, a plunger slidably disposed therein, a threaded rod engaging the said plunger and adapted to move the same longitudinally of the said tank, and a wheel rigidly secured to the extremity of said rod, means coacting with the said wheel adapted to limit the rotation thereof to one direction, and means whereby material as it is ejected from the tank is distributed upon said wheel.

5. A hog greaser comprising a receptacle, a plunger slidably disposed therein, a shaft extending through said receptacle and threadedly engaging said plunger, a wheel rigidly secured to the said shaft external of said receptacle, and a pipe leading from the said receptacle adapted to distribute material as it is ejected from the receptacle to and upon said wheel.

6. A hog greaser comprising a receptacle, a wheel rotatably secured thereto, said wheel provided with a corrugated peripheral surface adapted to be animal operated, means for limiting the rotation of the said wheel to one direction, a plunger slidably and non-rotatably disposed within the said receptacle, means secured to the said wheel and engaging the said plunger for the rectilinear motion thereof, and a distributing pipe communicating with the said receptacle and adapted to distribute material as it is ejected therefrom to and upon the corrugated peripheral surface of said wheel, said pipe provided with an inlet opening and means for the closing of said inlet opening.

In testimony that I claim the foregoing as my own, I have hereto affixed my signature in the presence of two witnesses.

FRANK HULLINGER.

Witnesses:
JAMES M. LEAVITT,
FRED McCULLOUGH.

Copies of this patent may be obtained for five cents each, by addressing the "Commissioner of Patents Washington, D. C."